(12) United States Patent
Lau et al.

(10) Patent No.: US 7,369,362 B2
(45) Date of Patent: May 6, 2008

(54) TAPE CLEANING APPARATUS

(75) Inventors: Ritz M. Lau, Superior, CO (US); Lee V. Jaderborg, Frederick, CO (US)

(73) Assignee: Quantum Corporation, San Jose, CA (US)

( * ) Notice: Subject to any disclaimer, the term of this patent is extended or adjusted under 35 U.S.C. 154(b) by 339 days.

(21) Appl. No.: 11/084,424

(22) Filed: Mar. 16, 2005

(65) Prior Publication Data

US 2006/0209460 A1 Sep. 21, 2006

(51) Int. Cl.
*G11B 23/02* (2006.01)

(52) U.S. Cl. .................................... 360/128

(58) Field of Classification Search ................ 360/128
See application file for complete search history.

(56) References Cited

U.S. PATENT DOCUMENTS

| | | |
|---|---|---|
| 3,731,289 A | 5/1973 | Bajgert et al. |
| 3,854,674 A | 12/1974 | Herger et al. |
| 4,165,526 A | 8/1979 | Jones |
| 4,315,294 A | 2/1982 | Wilson |
| 4,722,016 A | 1/1988 | Shirako et al. |
| 4,809,110 A | 2/1989 | Hertrich |
| 4,875,125 A | 10/1989 | Joannou et al. |
| 4,930,033 A | 5/1990 | Pergerson |
| 5,045,962 A | 9/1991 | Inoue et al. |
| 5,055,959 A | 10/1991 | Saliba |
| 5,105,322 A | 4/1992 | Steltzer |
| 5,214,553 A | 5/1993 | Kan et al. |
| 5,307,217 A | 4/1994 | Saliba |
| 5,349,713 A | 9/1994 | Stimpfl |
| 5,355,271 A | 10/1994 | Watanabe et al. |
| 5,453,894 A | 9/1995 | Kim et al. |
| 5,479,313 A | 12/1995 | Haba |
| 5,515,223 A * | 5/1996 | Grittmann et al. .......... 360/128 |
| 5,547,142 A | 8/1996 | Cheatham et al. |
| 6,028,751 A | 2/2000 | Fritsch et al. |

(Continued)

FOREIGN PATENT DOCUMENTS

| | | |
|---|---|---|
| EP | 0 293 805 A1 | 12/1988 |
| GB | 1 552 270 A | 9/1979 |

OTHER PUBLICATIONS

European Search Report mailed Jul. 13, 2006 for European Patent Application No. 06251398.1, three pages.

*Primary Examiner*—Allen Cao
(74) *Attorney, Agent, or Firm*—Morrison & Foerster LLP

(57) ABSTRACT

Devices, methods and systems for cleaning a tape media within a tape cartridge are described, particularly removable cleaning device inserts, and cartridges adapted to use cleaning device inserts. Removable cleaning device inserts generally include a holdfast surface and one or more tape cleaners comprising a cleaning surface. A holdfast surface may be used to secure the cleaning device insert within a tape cartridge. Tape cartridges for use with a cleaning device insert may include a housing at least partly enclosing a tape pathway, and an accessway through the housing for loading a cleaning device insert into the tape pathway within the tape cartridge housing. A tape media may be cleaned by inserting a cleaning device insert having a tape cleaner with a cleaning surface into a tape cartridge and contacting the cleaning surface to a tape traveling along the tape pathway.

19 Claims, 6 Drawing Sheets

U.S. PATENT DOCUMENTS

| | | |
|---|---|---|
| 6,067,212 A | 5/2000 | Poorman |
| 6,166,881 A | 12/2000 | Anderson et al. |
| 6,175,470 B1 | 1/2001 | Stamm |
| 6,215,618 B1 | 4/2001 | Anderson |
| 6,271,991 B1 | 8/2001 | Saliba et al. |
| 6,333,831 B1 | 12/2001 | Todd |
| 6,344,947 B1 | 2/2002 | Kudo |
| 6,433,961 B1 | 8/2002 | Tsuchiya et al. |
| 6,580,577 B1 | 6/2003 | Hanagata |
| 6,590,742 B2 | 7/2003 | Yamakawa |
| 2002/0048118 A1 | 4/2002 | Tanaka et al. |
| 2004/0035969 A1 | 2/2004 | Stamm et al. |
| 2004/0066725 A1 | 4/2004 | Usui |
| 2004/0136115 A1 | 7/2004 | Nayak et al. |
| 2006/0227459 A1 | 10/2006 | Hoge |

\* cited by examiner

TAPE CLEANING APPARATUS

BACKGROUND OF THE INVENTION

1. Field of the Invention

The present invention relates generally to cleaning inserts for cleaning tape media, tape media cartridges adapted to use cleaning inserts, and associated methods and systems for cleaning tape media.

2. Description of the Related Art

Tape media cartridges have proven to be an efficient and effective medium for data storage in computer systems. For example, magnetic tape cartridges generally include a housing containing a tape coated with a magnetic medium that can be used to record large amounts of data. The tape is generally wound around a reel, and may be fed from the cartridge to a data reading or writing device through a hinged door in the surface of the cartridge. These data stored on these cartridges may be read and/or written by using a data transducer (e.g., a read and/or write head) of a tape drive.

The accuracy of data transfer may be adversely affected by debris or contamination on the tape or on the data transducer head. The build up of debris may decrease the performance of the tape, or damage the tape, the tape cartridge, and/or the tape drive. Various devices and methods for cleaning transducer heads and magnetic tape have been described. For example, a cartridge housing a dedicated cleaning tape, commonly referred to as a "cleaning cartridge," may be used to clean a tape transducer head. A cleaning cartridge may include a tape that is manufactured with particular mechanical and/or chemical properties that provide for increased abrasiveness to clean debris from the transducer head of the drive. However, this method is limited, because it cleans only the transducer head, and does not remove debris from a magnetic tape.

Increased data storage capacity and retrieval performance is a goal of nearly all commercially viable data storage devices and media. In the case of tape media, this has increasingly led to smaller track widths and a decreasing physical separation between the transducer head and the data tape, which exacerbates the effects of debris and contamination on the data tape. Furthermore, even virgin data tape is likely to contain various amounts of debris and contamination such as dust or particles of the materials used to make the tape media, (e.g., the magnetic coating material).

Most data tape drives clean only the transducer head of the drive, using cleaning tape or brush mounted in the tape drive. However, these cleaning tapes and brushes do not remove debris already on the data tape within a cartridge. Moreover, removing debris from the transducer head in this fashion may only be a temporary solution, because debris may be merely displaced from the transducer head to other parts of the tape drive, where it may later contaminate the data tape and/or the transducer head. Debris may also block the sensing holes on a data tape leader, and thereby decrease performance of the data cartridge. Lose debris may accumulate inside these holes, or on other regions of the cartridge or the data tape itself. Thus, it may be desirable to remove debris from inside of a data cartridge, and from a data tape, before the tape comes into contact with the drive tape path components such as the transducer head.

BRIEF SUMMARY

Described herein are devices, methods and systems for cleaning a media tape, such as a magnetic tape within a magnetic tape media cartridge.

One example of a cleaning device insert for cleaning a tape media may be inserted and removed from a tape cartridge so that a tape in the tape cartridge may be cleaned therewith. The cleaning device inserts may include a tape cleaner comprising a cleaning surface for cleaning a tape, and a holdfast surface for releasably holding the cleaning device insert within a tape cartridge.

The cleaning device insert may also include a tape path guide for guiding a linear tape past the tape cleaner. In some versions, the cleaning device insert includes a grip for handling the cleaning device insert. The cleaning device insert may also include a lubricant for applying to the surface of a tape. The insert may also include a second tape cleaner comprising a second cleaning surface for cleaning a tape. The tape cleaner may be a wiper, a brush, or a combination of both. The cleaning surface of the tape cleaner may be an anti-static surface. For example, the cleaning surface may be in electrical contact with an electrostatic ground pathway.

Also described herein are tape cartridges for use with a cleaning device insert. The cartridge may include a housing at least partly enclosing a tape pathway, and an accessway through the housing for providing a cleaning device insert with access to the tape pathway. The cleaning device insert may be removably seated within the accessway and the cleaning device insert may be secured within the accessway by a holdfast.

In some versions, the tape cartridge also includes a tape path guide for guiding a linear tape past the cleaning device insert. The tape cartridge may also include a removable cleaning device insert for cleaning a tape. The removable cleaning device insert may include a first cleaning surface for cleaning a tape within the cartridge, and a holdfast surface for holding the cleaning device insert within the cartridge. The first cleaning surface for cleaning a tape within the cartridge may be moved in or out of the tape pathway without removing the tape cleaning insert. The removable tape cleaning insert may also include a second cleaning surface for cleaning a tape within the cartridge. The first cleaning surface may be for cleaning a first side of a tape, and the second cleaning surface may be for cleaning a second side of a tape.

Also described herein are methods of cleaning a tape within a tape cartridge housing that at least partly encloses a tape pathway. This method may comprise inserting a tape cleaner comprising a cleaning surface into the tape pathway within the tape cartridge, and contacting a tape traveling along the tape pathway with the cleaning surface. In some versions, this method may also include inserting a cleaning device insert into an accessway through the housing of the tape cartridge, and securing the cleaning device insert within the access.

Also described herein are systems for cleaning a tape within a tape cartridge housing. The system may include a cleaning device insert and a tape cartridge configured to use the cleaning device insert. The cleaning device insert may include a cleaning surface for cleaning a tape, and a holdfast surface for securing the cleaning device insert within a tape cartridge housing. A cartridge configured to use the cleaning device insert may comprise: a tape cartridge comprising a housing enclosing a tape pathway, and an accessway for allowing the cleaning device insert into the housing so that the cleaning surface of the cleaning device insert may be inserted into the tape pathway within the cartridge housing.

The present invention is better understood upon consideration of the detailed description below in conjunction with the accompanying drawings and claims.

DETAILED DESCRIPTION

Described herein are devices, methods and systems for cleaning a tape. In particular, cleaning device inserts (or "inserts"), tape cartridges for use with removable cleaning device inserts, and methods of using them are provided. The following description is presented to enable any person of ordinary skill in the art to make and use the invention. Descriptions of specific materials, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described and shown, but is to be accorded the scope consistent with the appended claims.

The tape cartridges and cleaning device inserts described herein may be used to remove loose debris and foreign contaminants from a tape media. The cleaning device insert may be inserted and removed from a tape cartridge, thereby removing the debris and contaminating material from the tape and cartridge, and preventing the tape or a media transducer head from being re-contaminated. New (or refurbished) cleaning device inserts may be inserted into a tape cartridge, and any used cleaning device insert may be disposed of or cleaned and reused.

In general, the cleaning device inserts comprise at least one tape cleaner having a cleaning surface that contacts the tape to remove debris. The cleaning device insert may be inserted through the housing of the tape cartridge into the tape pathway. Thus, a tape may be cleaned while still within the housing of a tape cartridge, and the tape cartridge may be adapted to allow insertion and removal of a cleaning device insert.

Tape Cartridge for Use with a Cleaning Device Insert

A cleaning device insert may be inserted or removed from any appropriate tape cartridge. In some versions of the tape cartridge, a cleaning device insert may be placed into the tape pathway within the housing of the tape cartridge, and later removed, or replaced. Any appropriate tape cartridge may be used or adapted for use with the cleaning device insert. Examples of tape cartridges that may be adapted to be used with cleaning device inserts are described in U.S. Pat. No. 6,271,991 to Saliba et al., herein incorporated by reference in its entirety. As used herein, tape cartridges include any cartridges useful for holding a length of tape (such as recording tape for storing computer data, video data, analog signals or any other type of information that may be stored on a tape). Tape may comprise magnetic media, optical media, or the like.

Figure 1:
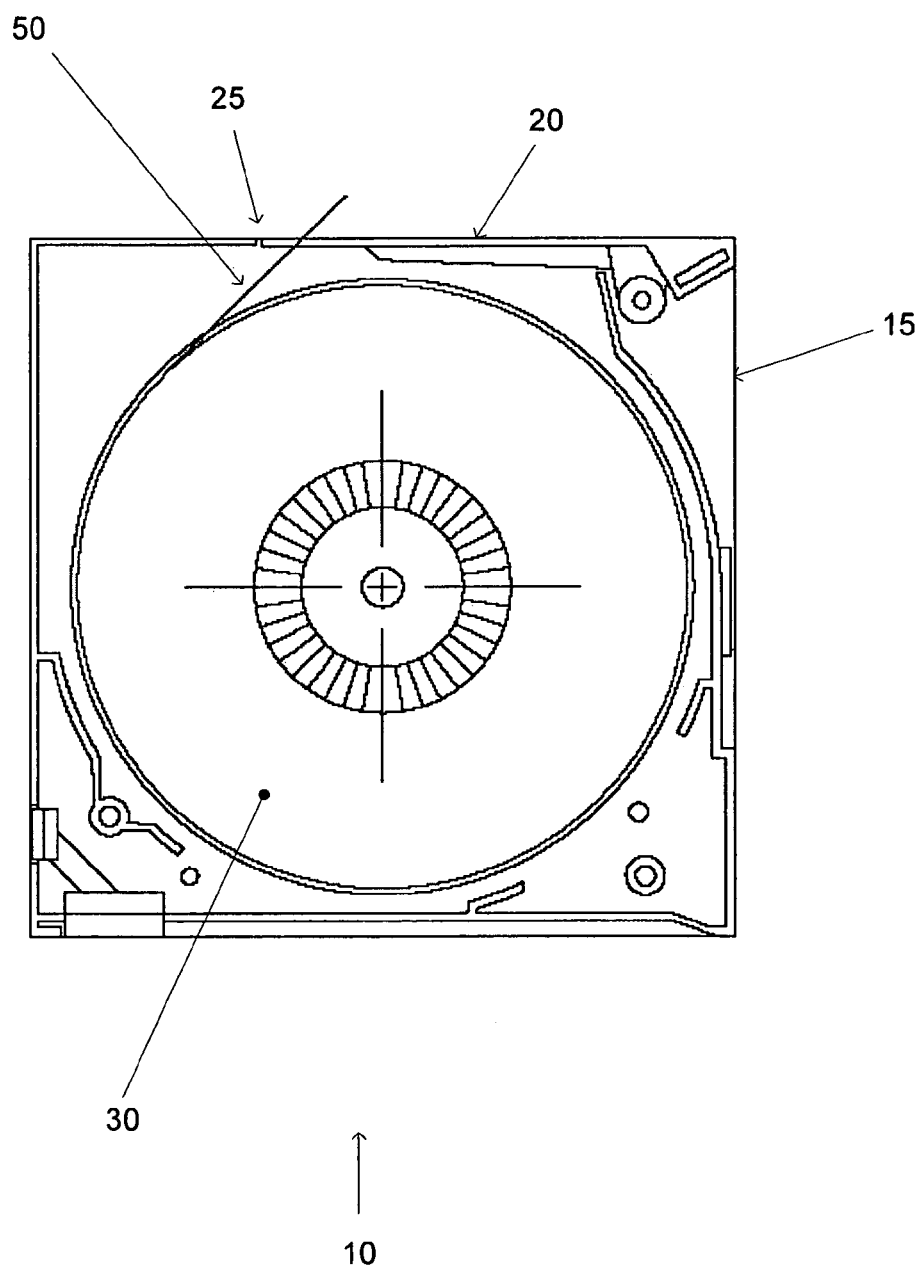
FIG. 1 illustrates a cutaway view of a prior art tape cartridge.
Figure 2A:
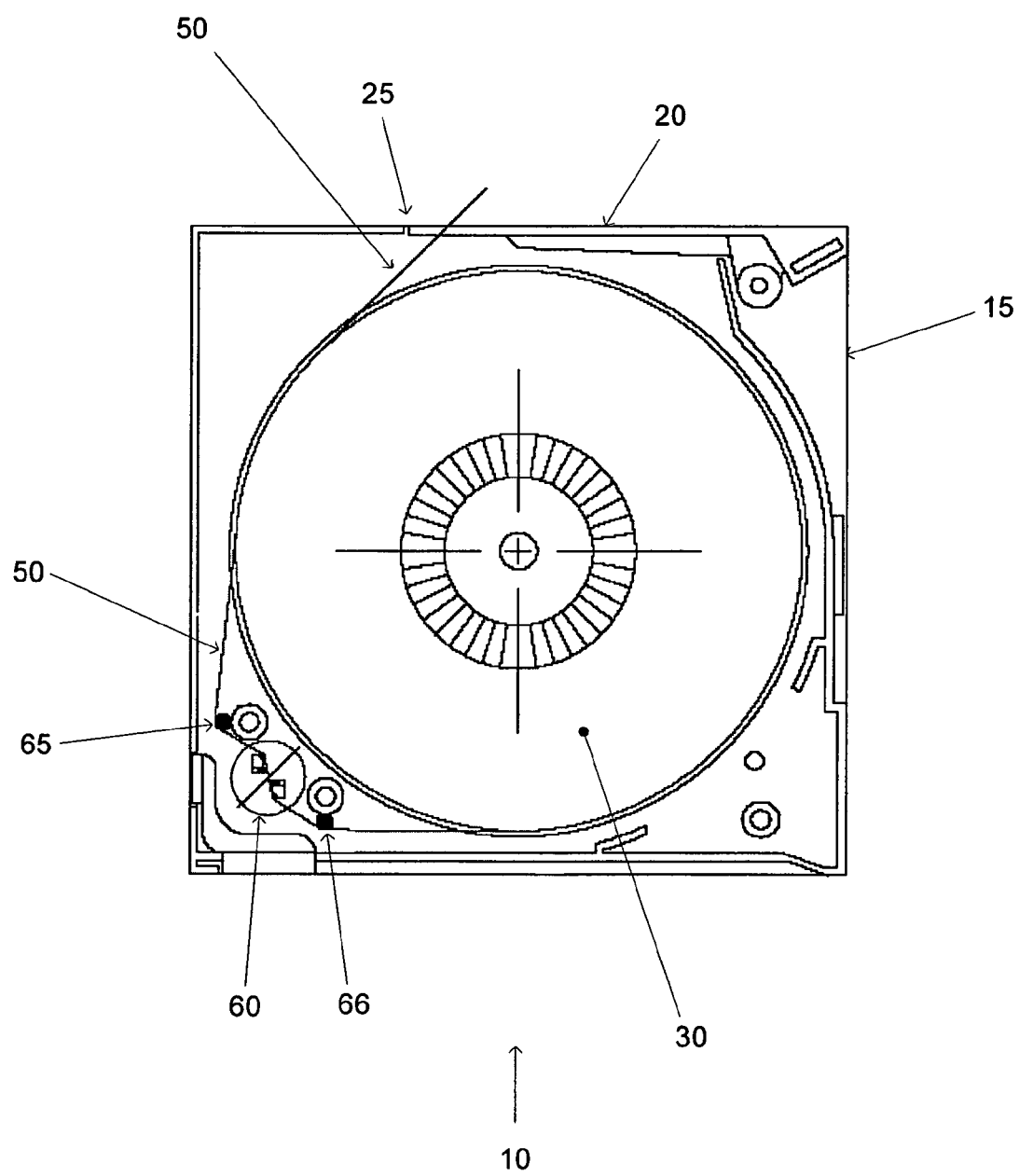
FIG. 2A illustrates a cutaway view of a tape cartridge having a cleaning device insert as described herein.

In general, a tape cartridge may comprise a housing, a tape media, a reel, and a tape pathway. FIG. 1 shows a cutaway view of one example of a typical tape cartridge 10 which may be adapted for use with a cleaning device insert as described herein. FIG. 2A shows an example of a tape cartridge similar to that shown in FIG. 1 that has been adapted so that a cleaning device insert 60 may be used with the cartridge. Elements described herein are consistently numbered between the figures. In FIGS. 1 and 2A, the tape cartridge 10 includes a housing 15, a door mounted on the housing 20, a reel 30 mounted within the housing, and a tape media 50. A tape cleaning device insert 60 is shown inserted into the tape path in FIG. 2A.

The housing 10 surrounds and encloses the tape media 50 and reel 30. The housing may provide support and define an interior region of the cartridge, and may have any appropriate shape and be made of any appropriate material. For example, the housing may be of any dimension or shape that permits the tape, tape reel, and cleaning device insert to be contained therein. The housing 10 shown in FIG. 1 is box-shaped, and contains a single reel 30, although any shape (e.g., disc-shaped, elliptical, square, triangular, etc.), that can contain one or more reels, may also be used. The housing may be formed from top and bottom "shells" which may be joined. The housing may also have one or more interior walls or supports. These interior walls may also define the tape pathway, by providing surfaces which guide the tape. The housing 10 may be composed of any appropriate material. For example, the housing (or portions thereof) may be made of metal, plastic, rubber, ceramics and composites thereof.

The reel 30 may be used as a tape-feed reel that is rotatably mounted within the housing. Tape may be wound onto and off of the reel. The reel may be of any appropriate shape for holding tape. For example, the reel may be any substantially circular structure capable of receiving, holding, or releasing a length of tape. The cartridge may have multiple reels. The motion of the reel 30 (or tension on the reel) may be controlled. For example, the central hub of a reel may be accessible from outside of the cartridge. The reel may also comprise teeth or gears to control the reel's rotary motion.

The tape cartridge may also have a tape exit 25 through which the tape may leave or return to the cartridge housing. Typically, a tape exit is an opening in the same plane of tape motion (e.g., on the side of the cartridge between the top and bottom shells, as shown in FIGS. 1 and 2). The tape exit 25 may be covered by a door 20 that attaches to the cartridge housing. The door 20 may be hinged, to allow the door to controllably cover and uncover the tape exit.

Any length of tape 50 may be held within the tape cartridge. Further, the tape may follow a defined tape pathway within the cartridge housing. For example, a length of tape 50 may be at least partly wound onto the reel, and then pass through various internal regions within the cartridge housing before exiting (or entering) the cartridge. The tape may be written to, read, or otherwise processed externally to the cartridge. Tape may be withdrawn from the cartridge by moving tape from the reel, through the cartridge by following a tape pathway, and then exit the housing of the cartridge through the tape exit. Tape may also be inserted into the cartridge by moving tape onto the reel after moving through the tape housing by following the tape pathway from the tape exit. The tape pathway may be defined by structures within the housing (or insertable within the housing) that guide the tape through the housing.

The tape may be guided through the cartridge housing along any appropriate tape pathway. For example, the tape pathway may be defined by tape guides. Tape guides may be any appropriate structure for controlling the pathway of the tape within the tape cartridge. For example, the tape guide may comprise a post, wall, or other surface. In some versions, the tape guide comprises a low-friction surface. In some versions, the tape guide may comprise a rotatable post or an air bearing. In some versions, the tape guide may comprise a tape cleaner having a cleaning surface (e.g., a brush or wiper), as described below.

Figure 2B:
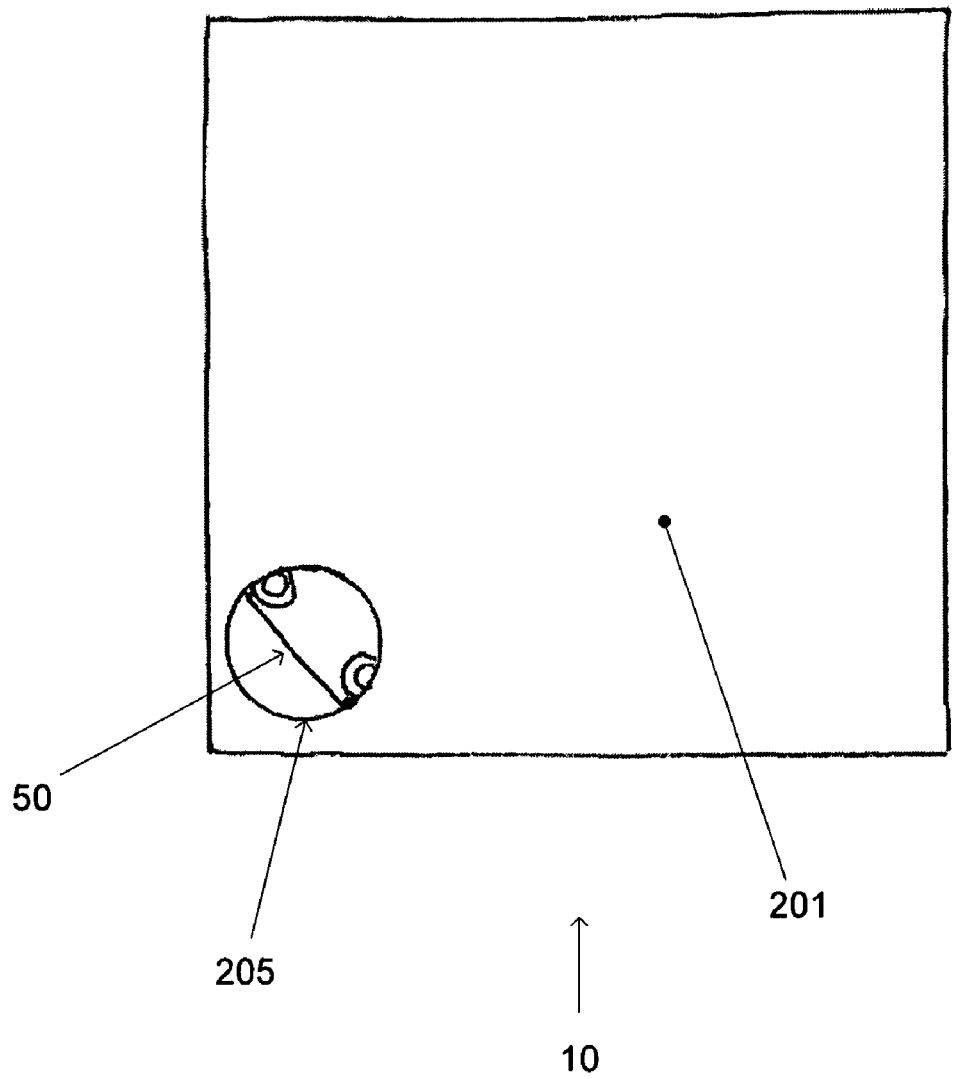
FIG. 2B shows a top view of a tape cartridge having a cleaning device insert as described herein.

A tape guide (or guides) may present the tape so that the cleaning device insert may access the tape, as shown in FIGS. 2A and 2B. The tape 50 extends between two tape guides 65, 66. Thus, the tape may be positioned by tape guides so that the tape may be cleaned by the cleaning device insert. In some versions, the cleaning device insert includes tape guides.

A tape cartridge for use with a cleaning device insert may comprises an accessway through the cartridge housing allowing insertion of a cleaning device insert into the tape pathway.

Accessway through the Cartridge Housing

Tape cartridges adapted to be used with cleaning device inserts may comprise an accessway into the cartridge housing to allow insertion of a cleaning device insert within the cartridge housing. FIG. 2B shows a top view of the cartridge shown in FIG. 2A, without the cleaning device insert 60. The accessway of the cartridge may be seen on the upper portion of the housing 201 (e.g., the "top" shell of the cartridge housing). The cleaning device insert 60 is not shown, showing the inner housing of the cartridge, and the tape 60. The tape path is accessible through the accessway 205, thereby giving access to the tape 60.

The accessway 205 may be any appropriate shape and size so that the cleaning device insert may be placed within the tape cartridge housing. For example, the accessway may be circular, as shown in FIG. 2B, or it may be a shape configured to match the shape of the cleaning device insert (e.g., square, rectangular, etc.). In some versions, the accessway may be configured to match a region of the cleaning device insert. For example, the accessway may be configured so that it is closed off (prohibiting further access to the cartridge housing through the accessway) when the cleaning device insert has been inserted.

The accessway may be located in any appropriate position on the cartridge. For example, the accessway may be located on only one side of the cartridge (e.g., the top, bottom or lateral sides) or it may completely "pass through" the cartridge (e.g., the accessway may comprise openings on opposite sides of a cartridge). A cartridge may have more than one accessway. In some versions, multiple cleaning device inserts may be used in the same cartridge, and may be inserted into multiple accesssways.

The accessway may also be closed off by an accessway cover, to prevent access into the cartridge housing when the cleaning device insert is not present. An accessway cover may be a separate piece (e.g., an attachable/removable cover piece) or a component that is attached to the housing of the cartridge. An accessway cover may be slideable over the opening formed by the accessway cover, so that it may prevent or allow access through the accessway cover. In some versions, an accessway cover may be used to close off the accessway when the cleaning device insert is positioned within the cartridge housing. For example, an accessway cover may act as a holdfast, securing the cleaning device insert within the cartridge.

Holdfast for Securing the Cleaning Device Insert within the Cartridge

The cleaning device insert may be secured within the cartridge housing so that the cleaning device insert may contact the tape for cleaning. The cleaning device insert may be secured within the cartridge by a holdfast that holds the cleaning device insert within the cartridge housing. The holdfast may be any appropriate structure for holding the cleaning device insert within the cartridge housing. In some versions, a region of the cleaning device insert comprises a holdfast. In some versions, a region of the tape cartridge (e.g., part of the accessway, or part of the cartridge housing) comprises a holdfast. In some versions, both the cleaning device insert and the tape cartridge may comprise a holdfast.

For example, the holdfast may be a mechanical holdfast that secures the cleaning device insert into position by mechanically securing the insert within the cartridge. Thus, the holdfast may comprise a latch, snap, buckle, belt, screw, clip, tie, bolt, stable, etc. In some versions, a holdfast comprises a tight fit between the cartridge housing and the cleaning insert, which may be tightened by moving the insert (e.g., by changing the orientation of the insert with respect to the cartridge housing). The holdfast may magnetically secure the cleaning device insert within the cartridge housing. The holdfast may permanently secure the cleaning device insert within the cartridge housing. In some versions, the holdfast removably secures the cleaning device insert within the cartridge housing. In some versions, the holdfast may also comprise an adhesive.

The cleaning device insert may comprise a holdfast surface for securing the insert within the housing of the cartridge by mating with a surface on the cartridge or a holdfast. In some versions, the cleaning device insert comprises a holdfast surface that may be locked into position on the cartridge by a complementary (e.g., anchoring) region on the cartridge housing. The holdfast surface may be any surface that is contacted by a region of the cartridge (or a holdfast that contacts or is attached to the cartridge) to hold the cleaning device insert in position. A holdfast surface may be a region of a holdfast. For example, the holdfast surface may be a threaded region for mating with grooves on a cartridge housing (e.g., in the accessway). In some versions, a holdfast surface comprises a surface against which force (e.g., friction or pressure) is applied by a holdfast. For example, the holdfast surface may comprise a strike plate for a latch attached to a cartridge housing.

Multiple holdfasts may be used to secure one or more cleaning device inserts within a cartridge housing. A holdfast may also be used to secure an accessway cover in a fixed position.

Cleaning Device Insert

Generally, a cleaning device insert may be positioned within a cartridge housing so that a cleaning surface of a tape cleaner may come into contact with the tape. Thus, the cleaning device insert may comprise one or more tape cleaners having a cleaning surface that may contact the tape.

Figure 3:
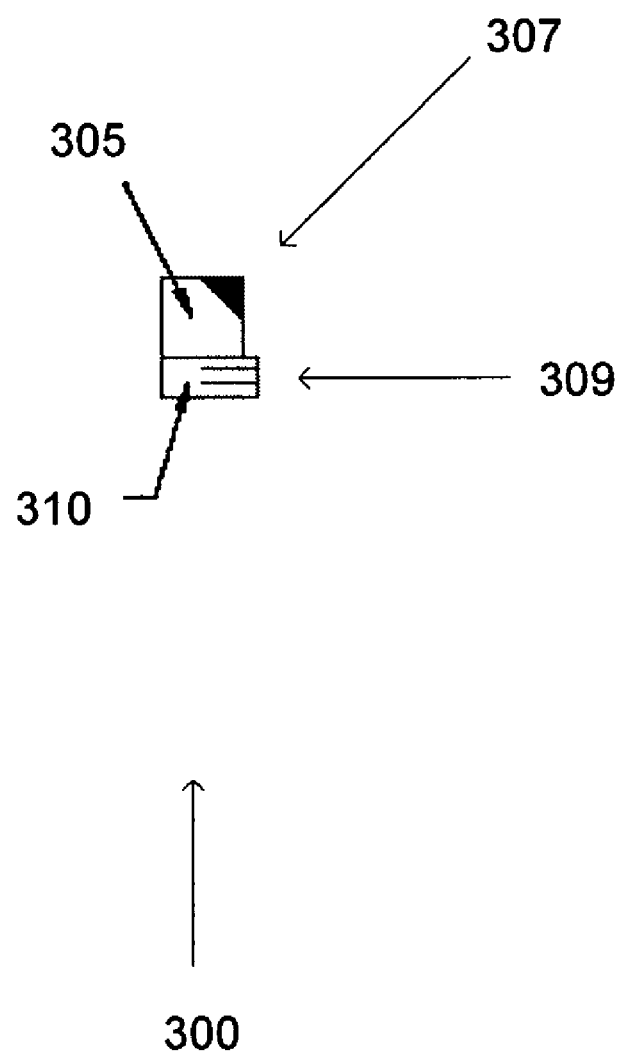
FIG. 3 illustrate a tape cleaner as described herein.

FIG. 3 shows an example of a tape cleaning 300 having a cleaning surface 307, 309. The tape cleaner in FIG. 3 is a compound tape cleaner, having two cleaning surfaces 307, 309. This tape cleaner comprises both a wiper region 305 and a brush region 310. Any appropriate type of tape cleaner that may remove debris from a tape may be used. For example, brushes, scrapers, wipers, and combinations thereof may be used. Tape cleaners generally have at least one cleaning surface that is capable of removing debris from a tape. Cleaning surfaces may remove debris from a tape by friction (e.g., by rubbing) or by having a higher affinity for the debris than the tape surface. For example, the cleaning surface may comprise an adhesive for removing the debris from the tape surface.

A cleaning surface may also comprise a material capable of trapping debris. For example, the cleaning surface may comprise a woven, fibrous, or porous material. The cleaning surface may also comprise an irregularly shaped surface. In some versions, the cleaning surface may comprise an abrasive surface. In some versions, the cleaning surface may comprise a non-abrasive material (e.g., a finely woven material). In some versions, the cleaning surface comprises a cleanser for removing debris or contamination from a tape surface. For example, the cleaning surface may comprise any appropriate solvent (e.g., alcohol, water, etc) for removing debris without damaging the tape.

A tape cleaner and a cleaning surface may be made of any appropriate material. In some versions, the tape cleaner comprises an electrically conductive material so that the tape cleaner may be gounded to conduct away any static charge on the tape surface. In some versions, the tape cleaner comprises a coating that makes up the cleaning surface. For example, the tape cleaning surface may comprise an anti-static coating. The tape cleaner (and cleaning surface) may comprise a wear-resistant material. For example, the tape cleaner may comprise AlTiC.

A tape cleaner may be a brush 310, such as a brush having bristles that project outward to contact the tape 309. Thus, the bristles of the brush may comprise the cleaning surface. The brush may be made of any appropriate material and shape. For example, softer bristles may be used so as not to scratch the surface of the tape.

A tape cleaner may be a wiper 305, having a flat or angular head for contacting a tape surface 307. The wiper may also comprise any appropriate material for removing debris. In some versions, the wiper may be attached to a reservoir for holding a fluid (e.g., a cleaning solution or lubricant) that may be applied by the wiper during cleaning. In some versions, the wiper may comprise a scraper that scrapes debris off of the surface of a tape. For example, in FIG. 3, the edge of the wiper 307 is a tape cleaning surface that may scrape debris from the tape.

Debris may be removed from the tape surface by moving the tape across the tape cleaner's cleaning surface. Thus, the cleaning device insert may clean the tape surface during the operation of a tape as it moves along the tape path of the tape cartridge. In some versions, the tape is cleaned by the insert as it is read or written to during use of the tape cartridge. In some versions, the tape is cleaned during a special "cleaning run" of the tape cartridge. Thus, the cleaning device insert may be engaged to clean the tape some of the time, or all of the time.

Figure 4A:
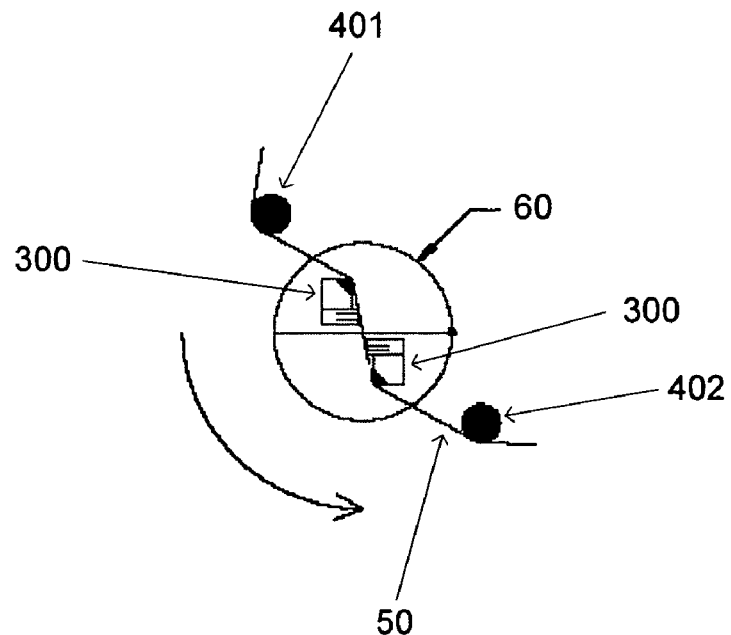
FIGS. 4A and 4B show one embodiment of a cleaning device insert as described herein.
Figure 4B:
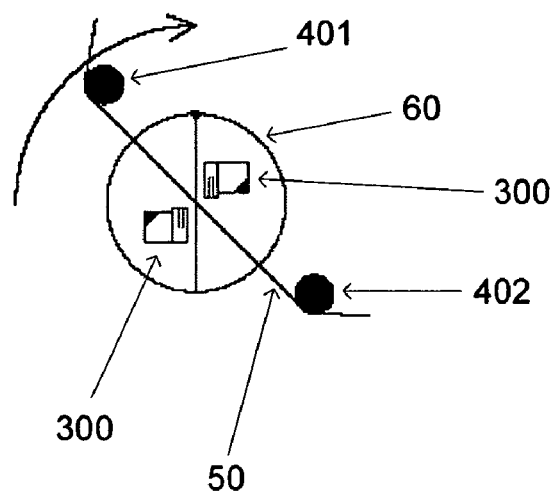

Thus, the cleaning device insert may be selectively engaged. For example, the cleaning surface of the tape cleaner may be controllably moved into contact with the surface of the tape, or the cleaning surface may be moved out of contact with the surface of the tape. FIGS. 4A and 4B illustrates a cleaning device insert that may be moved from a tape contacting position (e.g., FIG. 4A) to a non-contacting position (e.g., FIG. 4B).

In FIGS. 4A and 4B, the cleaning device insert 60 has two tape cleaners 300 that both comprise a wiper and a brush, similar to the tape cleaner 300 shown in FIG. 3. The cleaning device insert 60 may be rotated. Rotating the cleaning device insert may vary the amount of contact between the cleaning surfaces of the cleaning device insert and the tape. For example, in FIG. 4A, both the wiper and the brush cleaning surfaces of each tape cleaner are in contact with the tape 50. The amount of contact between the cleaning surfaces of the cleaning device insert and the tape may be controlled by rotating the cleaning device insert. For example, rotating the cleaning device insert counterclockwise (as shown by the arrow in FIG. 4A), may decrease the amount of contact with the cleaning surfaces of the cleaning device insert. Further, the rotational position of the cleaning device insert may alter the contact angle between the tape and the tape cleaners, which may change the amount of stress applied to the tape, as well as the resistance of the tape to motion through the tape pathway of the cartridge.

In some versions, the cleaning device insert 60 may have an insertion (or "loading") position and one or more cleaning (or "running") positions. In FIG. 4B, for example, the cleaning device insert 60 is in a loading position in which the tape is not contacted by any of the cleaning surfaces of the cleaning device insert. Clockwise rotation of the cleaning device insert (indicated the by the arrow) will result in the tape contacting the tape cleaners. Thus the position of the cleaning device insert shown in FIG. 4B may be converted from the loading position to the running position of FIG. 4A. In some versions, the cleaning device insert may attach to a mount (e.g., an axel or pivot) within the cartridge housing to allow rotation. The cleaning device insert may also be "lockable" in one or more of these positions. For example, the holdfast may be configured to hold the cleaning device insert in one or more position. In some versions, the cleaning device insert may include anchors (e.g., gears, teeth, etc) to allow control of the rotational position of the cleaning device insert.

In some versions, the cleaning device insert may stay fixed, while the tape guides may change position to alter the pathway of the tape through the cleaning device insert. In FIGS. 4A and 4B, tape guides are shown as wear resistant poles.

Figure 5A:
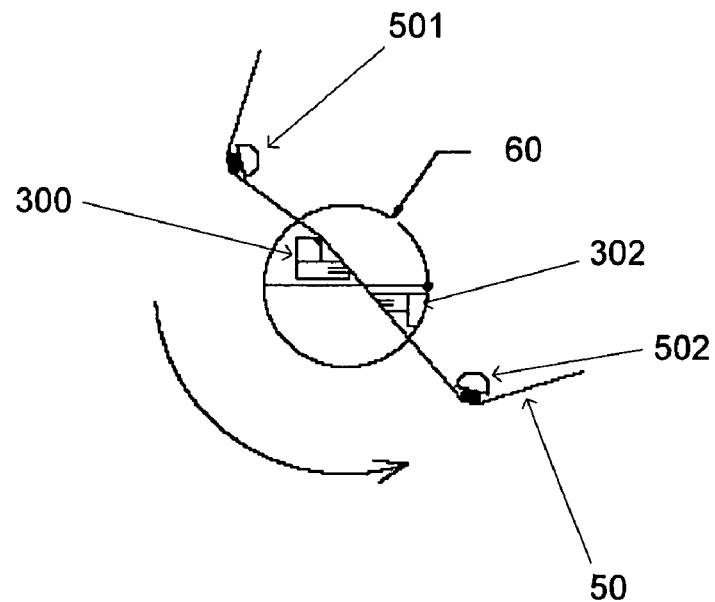
FIGS. 5A and 5B show another embodiment of a cleaning device insert as described herein.
Figure 5B:
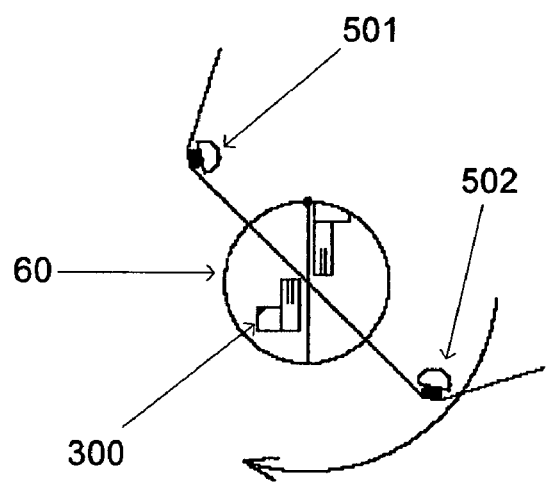

Both sides of a tape may be cleaned using a cleaning device insert as shown in FIGS. 4A and 4B. Each of the two tape cleaners cleans one side of the tape as it passes through the insert. The cleaning device insert shown in FIGS. 4A and 4B is symmetric, and the tape cleaners 300 are shown as identical, though they contact different sides of the tape. In some versions, tape cleaners of the cleaning device insert may be different or optimized individually for debris removal from different tape surfaces. For example, different kinds of tape (or different sides of the same tape) may be best suited to different wiper or brush materials and/or different contact angles. FIGS. 5A and 5B show a cleaning device insert 60 in which the tape cleaners are different and are arranged so that one of the tape cleaners 300 contacts the tape more than the other tape cleaner 301 when the cleaning device insert is engaging the tape.

In some versions, different wiping patterns may be used for different types of media and/or for different usage conditions of one or more type of media. For example, tape in which a magnetic coating is used on only one side of the tape may have different tape cleaners (in the same cleaning device insert) for cleaning both the magnetic side of a tape, and the non-magnetic side of a tape.

FIG. 5A also illustrates tape guides that are also tape cleaners 501. Both tape guides shown in FIGS. 5A and 5B comprise wipers which may aid in removal of debris from the tape. In some versions, the cleaning device insert may also comprise tape guides which may further modify the tape pathway. For example tape guides may limit the angle between the tape and the tape cleaner.

A cleaning device insert may comprise more than one tape cleaner or more than one tape cleaning surface. Furthermore if more than one tape cleaner is used, they may be arranged in any reasonable way on the cleaning device insert. Although FIGS. 4A, 4B, 5A and 5B show tape cleaners arranged on opposite sides of a tape (and therefore configured to clean both sides of the tape), the tape cleaners may be arranged on the same side of the tape.

In some versions, the cleaning device insert may include a handle or grip to facilitate manipulation and/or insertion of the cleaning device insert. For example, the cleaning device insert may comprise a finger grip. The cleaning device insert may also include a marker indicating the orientation of the cleaning device insert within the cartridge cavity.

The cleaning device insert may be reusable or disposable. For example, the cleaning device insert may be made of a material which may be washable, or may have replaceable parts.

Systems and Methods of Using the Cleaning Device Insert

Debris removal using the cleaning device insert may have two steps. First, debris may be removed from the media surface by the cleaning surfaces of the cleaning device insert. Second, the debris may be removed from a cartridge so that they cannot re-contaminate the tape by removing and/or replacing the cleaning device insert within the cartridge. Thus, the cleaning device insert and a cartridge configured to use a cleaning device insert may be a system for cleaning tape by removing debris from the tape. Additional components may be added to such a system for debris removal.

A controller may be included for controlling the cleaning device insert and therefore debris removal. For example, a controller may control the position of the cleaning device insert, and/or the speed of the tape through the insert. In some versions, a controller may monitor the status of the cleaning device insert. The controller may be automatically controlled, or may be controlled by a user.

Indicators may be used with or without a controller for indicating the status of the cleaning device insert. For example, an indicator may indicate how long a cleaning device insert has been in use, the position of the cleaning device insert, the amount of wear of the cleaning device insert, and the like. Indicators may be visual (e.g., color, lights, etc.) or non-visual (e.g., electrical signals). Further, indicators may produce output that is directly readable or machine readable (or both). For example, an indicator may comprise a gauge on an outer surface of a cartridge housing indicating how long cleaning device insert has been in use.

Methods of using the cleaning device insert may generally include the steps of inserting a tape cleaner comprising a cleaning surface into the tape pathway within the tape cartridge, and contacting the cleaning surface of the tape cleaner to a tape traveling along the tape pathway.

A tape cartridge adapted to hold a cleaning device insert may be loaded with a tape cleaning device insert by opening the accessway through the cartridge housing and inserting the cleaning device insert. In some versions, the cleaning device insert is loaded into the cartridge so that the tape cleaner (or cleaners) of the cleaning device insert is not initially in contact with the tape. The accessway through the cassette housing may provide access to the tape pathway in the cartridge. Once the cleaning device insert is loaded, it may be rotated into a desired position, most likely in contact with the tape, and then locked into position using a holdfast to secure the cleaning device insert within the cartridge housing by contacting a holdfast surface on the cleaning device insert. In some versions, the holdfast may also secure the position of the cleaning device insert within the cartridge housing. For example, the holdfast may keep the cleaning device insert in contact with the tape. In some versions, the cleaning device insert is still movable within the cartridge assembly even after the holdfast is secured.

Once the cleaning device insert is loaded, the tape may then be cleaned by running the tape through the tape pathway within the cartridge, when the tape is in contact with at least one cleaning surface of the cleaning device insert. Cleaning may occur as part of normal use (e.g., continuously as the tape is used to read/write data), or may be done as a special cleaning cycle. Thus, the speed at which the cartridge is run may be regulated as part of the cleaning method or may be unregulated. Additional steps may comprise monitoring the status of the cleaning device insert (e.g., the age, the amount of wear, the amount of debris collected, etc.).

The cleaning device insert may also be removed from the cartridge by reversing the insertion steps. In some versions, the cleaning device insert may be disengaged from the tape. For example, the cleaning device insert may be rotated out of the tape pathway. After the holdfast is removed or disconnected, the cleaning device insert may be removed from the tape cartridge by removing it from the cartridge housing. The cleaning device insert may then be cleaned or disposed of, and a fresh cleaning device insert may be loaded into the cartridge, as previously described. In some versions, a cleaning device cartridge is not reloaded, and the accessway through the cartridge housing may be closed (e.g., by a door).

The above detailed description is provided to illustrate exemplary embodiments and is not intended to be limiting. It will be apparent to those skilled in the art that numerous modifications and variations within the scope of the present invention are possible. Throughout this description, particular examples have been discussed, including descriptions of how these examples may address certain disadvantages in related art. However, this discussion is not meant to restrict the various examples to methods and/or systems that actually address or solve the disadvantages. Accordingly, the present invention is defined by the appended claims and should not be limited by the description herein.

What is claimed is:

1. A cleaning device insert for insertion into and removal from a tape cartridge, so that a tape in the tape cartridge is cleaned therewith, the cleaning device insert comprising:
   a tape cleaner comprising a first cleaning surface for cleaning a first side of a tape and a second cleaning surface for cleaning a second side of the tape, wherein the tape cleaner is configured to be releasably held within a tape cartridge by a holdfast, and further wherein the tape cleaner is positionable within the tape cartridge in a first position for cleaning the first and second side of the tape and a second position where the first and second cleaning surfaces do not contact the tape.

2. The cleaning device insert of claim 1, further comprising a tape path guide for guiding a tape past the tape cleaner.

3. The cleaning device insert of claim 1, further comprising a grip for handling the cleaning device insert.

4. The cleaning device insert of claim 1, further comprising a lubricant for applying to the surface of a tape.

5. The cleaning device insert of claim 1, further comprising a holdfast for releasably holding at least a portion of the cleaning device insert within a tape cartridge.

6. The cleaning device insert of claim 1, wherein said tape cleaner comprises a wiper.

7. The cleaning device insert of claim 1, wherein said tape cleaner comprises a brush.

8. The cleaning device insert of claim 1, wherein said cleaning surface of the tape cleaner comprises an anti-static surface.

9. The cleaning device insert of claim 8, wherein the cleaning surface is in electrical contact with an electrical ground pathway.

10. The cleaning device insert of claim 1, wherein the tape cleaner comprises a brush and a wiper for removing debris from a tape.

11. The cleaning device insert of claim 1, wherein the first and second cleaning surfaces are spatially fixed with respect to each other, and the tape cleaner is rotatable within the tape cartridge from the first position to the second position.

12. A tape cartridge for use with a cleaning device insert, the cartridge comprising:
- a housing at least partly enclosing a tape pathway;
- an accessway through the housing for providing a cleaning device insert with access to the tape pathway, wherein the cleaning device insert is removably seated within the cartridge by a holdfast; and
- a cleaning device insert comprising a first cleaning surface for cleaning a first side of a tape within the cartridge and a second cleaning surface for cleaning a second side of the tape, wherein the first and second cleaning surfaces are operable to be moved into or out of the tape pathway without removing the tape cleaning insert from the housing.

13. The tape cartridge of claim 12, further comprising a tape path guide for guiding a tape past the cleaning device insert.

14. The tape cartridge of claim 12, wherein the first and second cleaning surfaces are spatially fixed with respect to each other, and the cleaning device insert is rotatable within the tape cartridge for moving into or out of the tape pathway.

15. A method of cleaning a tape within a tape cartridge housing that at least partly encloses a tape pathway, the method comprising:
- inserting a cleaning device insert into the tape pathway within the tape cartridge, wherein the cleaning device insert comprises a tape cleaner having a first cleaning surface and a second cleaning surface for cleaning a first and second side of the tape, wherein the tape cleaner is releasably held within the tape cartridge by a holdfast, and wherein the first and second cleaning surfaces are operable to move into or out of the tape pathway without being removed from the tape cartridge; and
- contacting the tape traveling along the tape pathway with the first and second cleaning surfaces.

16. The method of claim 15, further comprising: inserting the cleaning device insert into an acces sway through the housing of the tape cartridge; and securing at least a portion of the cleaning device insert within the housing.

17. The method of claim 15, wherein the first and second cleaning surfaces are spatially fixed with respect to each other, and the cleaning device insert is rotatable within the tape cartridge for moving into or out of the tape pathway.

18. A system for cleaning a tape within a tape cartridge housing including:
- a cleaning device insert comprising a cleaning surface for cleaning the tape, wherein the cleaning device insert is releasably held within the tape cartridge by a holdfast; and
- the tape cartridge comprising a housing enclosing a tape pathway, and an accessway for allowing the cleaning device insert into the housing so that the cleaning surface of the cleaning device insert is operable to be inserted into the tape pathway within the cartridge housing, wherein:
  - the cleaning device insert comprises a first cleaning surface for cleaning a first side of the tape within the cartridge and a second cleaning surface for cleaning a second side of the tape, and
  - the first and second cleaning surfaces are operable to move into or out of the tape pathway without removing the tape cleaning insert from the tape cartridge.

19. The system of claim 18, wherein the first and second cleaning surfaces are spatially fixed with respect to each other, and the cleaning device insert is rotatable within the tape cartridge for moving into or out of the tape pathway.

* * * * *